US007080356B2

(12) United States Patent
Atallah et al.

(10) Patent No.: US 7,080,356 B2
(45) Date of Patent: Jul. 18, 2006

(54) CERTIFICATION TEST SUITE

(75) Inventors: Dario Atallah, Louisville, CO (US); Jacques Truchet, Toussus le Noble (FR)

(73) Assignee: Sun Microsystems, Inc., Santa Clara, CA (US)

( * ) Notice: Subject to any disclaimer, the term of this patent is extended or adjusted under 35 U.S.C. 154(b) by 715 days.

(21) Appl. No.: 10/246,076

(22) Filed: Sep. 18, 2002

(65) Prior Publication Data

US 2004/0054988 A1 Mar. 18, 2004

(51) Int. Cl.
*G06F 9/44* (2006.01)
*H04L 9/00* (2006.01)
*G06F 17/30* (2006.01)

(52) U.S. Cl. .......................... 717/124; 713/168; 707/9; 707/10

(58) Field of Classification Search ................ 717/124, 717/127, 126, 132, 171, 176, 130, 121; 710/36; 719/331; 714/7, 38
See application file for complete search history.

(56) References Cited

U.S. PATENT DOCUMENTS

| 5,313,616 | A | * | 5/1994 | Cline et al. .................. 717/127 |
| 5,617,533 | A | | 4/1997 | Wu et al. |
| 5,854,924 | A | * | 12/1998 | Rickel et al. ................ 717/132 |
| 5,923,878 | A | | 7/1999 | Marsland |
| 5,991,871 | A | | 11/1999 | Zucker |
| 6,119,206 | A | | 9/2000 | Tatkar et al. |
| 6,151,643 | A | * | 11/2000 | Cheng et al. .................. 710/36 |
| 6,253,257 | B1 | * | 6/2001 | Dundon ....................... 719/331 |
| 6,289,505 | B1 | | 9/2001 | Goebel |
| 6,330,518 | B1 | | 12/2001 | Colson |
| 6,363,402 | B1 | | 3/2002 | Matsuura |
| 6,366,876 | B1 | | 4/2002 | Looney |
| 6,381,742 | B1 | * | 4/2002 | Forbes et al. ................ 717/176 |
| 6,401,241 | B1 | | 6/2002 | Taylor |
| 6,425,118 | B1 | | 7/2002 | Molloy et al. |

OTHER PUBLICATIONS

Kim-Spafford, The Design and Implementation of Tripwire: A File System Integrity Checker, Nov. 1994, ACM.*

(Continued)

*Primary Examiner*—Antony Nguyen-Ba
(74) *Attorney, Agent, or Firm*—Michael C. Martensen; William J. Kubida; Hogan & Hartson LLP (57) ABSTRACT

A system and method for assessing binary compatibility between software modules permits software developers to register with a system, download software tools for testing binary compatibility between their software products and one or more ABIs. The system further enables software developers to certify their binary compatibility with one or more ABIs by uploading compatibility information to the system. A unique identifier of the software, e.g., the MD5 signature of the binary code, may be uploaded with the results of the compatibility test. The results of the compatibility test and the unique identifier may be stored in a database to record whether the developer's software is binary compatible with one or more of the ABIs. In addition, computer users may register with the system, utilize a tool that collects the MD5 signatures of the binary files on their computer(s) and forward the MD5 signatures to the system. The system may receive the MD5 signatures, compare them to the MD5 signatures on record, and generate a report indicating the binary compatibility of the files resident on the user's computer system.

18 Claims, 5 Drawing Sheets

OTHER PUBLICATIONS

Czerwinski et al., An Architecture for a Secure Sevice Discovery Service, Aug. 1999, ACM.*

Weitlaner, Metadata Visualisation—Visual Exploration of File Systems and Search Result Sets based on Metadata Attributes, Dec. 1999, Graz University of Technology, A-8010 Graz, Austria.*

Catuogno-Visconti, A Format-Independent Architecture for Run-Time Integrity Checking of Executable Code, Undated, Dipartimento di Informatica ed Applicazioni, Universita di Salerno Via S. Allende, 84081 Baronissi (SA), Italy, {luicat, visconti}@dia.unisa.it.*

* cited by examiner

CERTIFICATION TEST SUITE

BACKGROUND OF INVENTION

1. Field of the Invention

The present invention relates to computer software, and more particularly to systems and methods for assessing binary compatibility between software products.

2. Background

Modern multi-user/multitasking computer systems run complex operating systems to accomplish concurrent executions of myriad user applications. Broadly speaking, an operating system may be defined as system software that schedules tasks for execution by one or more processing units in a computer system, allocates storage among various application programs, handles the system interface to the peripheral hardware, and presents a default interface to the user when no application program is running. Some examples of operating systems include the UNIX® operating system, the IBM OS/2® operating system, the Microsoft Windows® family of operating systems and MS-DOS®, the Macintosh® operating system, the Novell Netware® system, the Digital Equipment Corporation's VMS® operating system, and the SOLARIS™ UNIX® operating system from Sun Microsystems.

An operating system program may be divided into two parts: (1) the operating system kernel that contains the major operating system functions, such as the scheduler, and (2) various system programs which use facilities provided by the kernel to perform higher-level house-keeping tasks, such as providing an interface to various user application programs. An application program may be defined as a program that performs a specific function directly for the user (perhaps using one or more operating system services via the above mentioned interface). This is in contrast to system software, such as the operating system kernel, which supports the application programs. Word processing and spreadsheet software are common examples of popular application programs.

Operating systems are updated periodically to enhance features, performance, or other parameters. Current versions of application programs may not be compatible with a new version of an operating system. Therefore, consumers may be required to purchase new versions of application programs, which may be an expensive proposition. In large organizations, this can result in significant costs in upgrading independent software vendor (ISV) software, significant delays and expenditure associated with migrating application software and its accompanying data, and an increase in cost of the overall project.

Therefore, there is a need in the art for systems and methods for determining compatibility between application programs and operating systems. More particularly, it would be desirable to provide a tool for application software developers to assess the compatibility of their software programs with existing versions of operating systems on which the software may execute.

SUMMARY OF THE INVENTION

The present invention addresses these and other issues by providing systems and methods for assessing binary compatibility between software modules, or binary files thereof, and an application binary interface (ABI). In one aspect, software developers may use the systems and methods to determine compatibility of their software application binaries with an application binary interface. In another aspect, end users may use the systems and methods to assess the binary compatibility of software installed on their system(s) with one or more ABIs.

In an exemplary embodiment, the invention provides a computer-based method for determining compatibility between a first software module and a second software module. The method comprises receiving registration information from a subscriber, storing the registration information in a computer readable medium, providing a compatibility testing tool kit to the subscriber, and receiving a certification request from the subscriber. In response to the certification request, the method analyzes the first software module for compatibility with the second software module, assigns an identifier that uniquely identifies the first software module; and stores the results of the compatibility test and the identifier in a computer readable medium.

In another embodiment, the invention provides a computer-based system for determining binary compatibility between application software and the SOLARIS™ operating system (also referred to as "SOLARIS™") ABI. The system comprises a registration module for receiving registration requests from subscribers to the system and storing the registration information in a computer readable medium, a certification test suite system module comprising software tools for testing binary compatibility between application software and the SOLARIS™ ABI, wherein the software tools are made available to registered subscribers of the system, an update advisor module that collects a unique identifier to the application software, and computer readable media for storing the identifier collected by the update advisor module and the results of the binary compatibility tests.

In yet another embodiment, the invention provides a computer-based method for evaluating the compatibility between one or more binary files on a computer and one or more ABIs. The method comprises storing, in a network-based computer, compatibility information between binary files and one or more ABIs, wherein the compatibility information is associated with an identifier that uniquely identifies the binary file, receiving registration information from a subscriber, storing the registration information in a computer readable medium, receiving the unique identifiers of binary files on the subscriber's computer system, comparing the received unique identifiers to unique identifiers in a database associated with the network-based computer; and generating a report indicating which of the received unique identifiers have a match in the database associated with the network computer.

BRIEF DESCRIPTION OF THE DRAWINGS

The foregoing and other features, utilities and advantages of the invention will be apparent from the following more particular description of a preferred embodiment of the invention as illustrated in the accompanying drawings.

DETAILED DESCRIPTION

Aspects of the present invention will be described with reference to certifying binary compatibility between application software and the Sun Solaris ™ operating system, or more particularly between application software and the Sun Solaris™ Application Binary Interface (ABI). It will be appreciated, however, that the present invention is not so limited.

The term binary compatibility refers to maintaining compatibility between a binary (i.e., compiled) version of a first software module, e.g., an application module, and a second software module, e.g., an operating system. The Solaris™ operating system complies with an ABI, which is a set of supported run-time interfaces available for an application to use. Among other things, the Solaris™ ABI defines the interfaces provided by the system libraries, the interfaces provided by the kernel system calls, the locations and formats of various system files and directories, and the input and output syntax and semantics of system utilities. An application that is binary compatible with the ABI of a particular version of an operating system should be compatible with any other version of the operating system that maintains the same ABI.

The Solaris™ ABI changes infrequently, and only with significant advance notice. Therefore, the Solaris™ ABI is a useful reference for developers to ensure that applications being developed rely on interfaces that are stable, such that they will run on subsequent releases of the operating system. In addition, the ABI is a useful reference for end users to evaluate whether application software is ABI compatible, and therefore will work on the operating system. Information about the Solaris™ ABI is available at the website located at www.sun.com.

To aid users and developers in building stable SOLARIS™ applications, Sun has produced two tools that determine whether an application is using the correct (i.e., public) SOLARIS™ interfaces, and that it is using them correctly. The first tool, appoert, is a PERL script that statically examines ELF (Executable and Linking Format) binaries (i.e., executables and shared objects) to see what SOLARIS™ library interfaces they use. Appcert compares the list of interfaces used against the definition of which interfaces in each SOLARIS™ library are public and private. The appcert utility then produces summary and detailed reports of any potential binary stability problems detected.

The appcert utility may be executed by simply providing it with the name of one or more binary files to check. Appcert first ensures that the file is suitable for checking (e.g., that the file has execution permissions set and is not suid root). Then, appcert uses the debugging mode to collect the binary's symbols, which may be checked against the definition of public and private symbols for that library in that release of SOLARIS™. In addition, appcert checks executables for static linking of libraries. If an executable is completely statically linked, then appcert generates a report indicating this fact. Appcert can also detect partial static linking using heuristic techniques.

It should be noted that the appeert utility flags potential binary stability problems. Most private interfaces remain unchanged in any given update of SOLARIS™. However, they may change at any time.

The second tool, pathchk, The pathchk tool checks that one or more path names are valid (i.e., that they could be used to access or create a file without causing syntax errors) and portable (i.e., no filename truncation will result). The ABI tools allow easy and rapid identification of which binaries may have binary compatibility with a given release of SOLARIS™.

Figure 1:
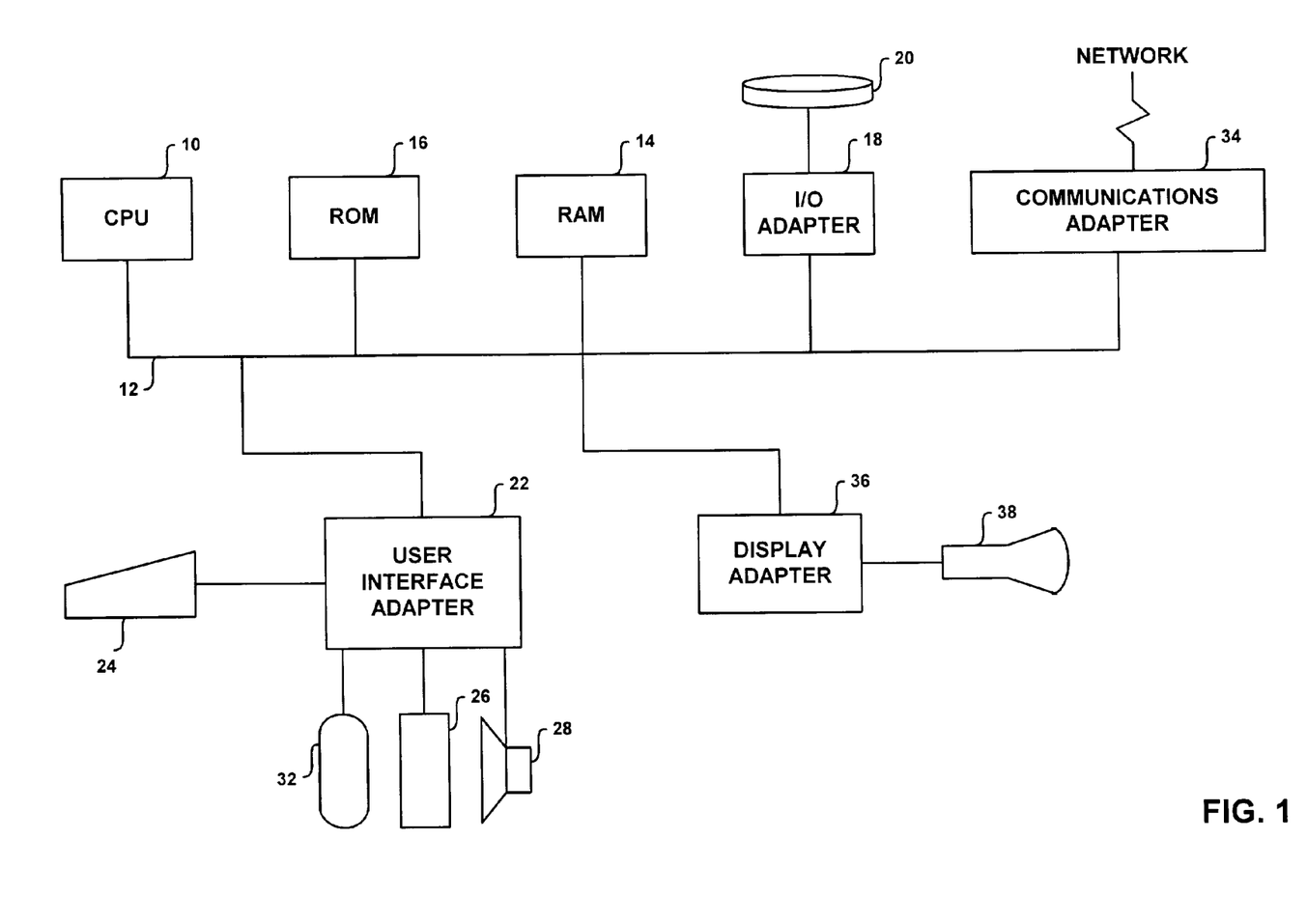
FIG. 1 is a schematic illustration of an exemplary hardware system in which the present invention may be implemented.

An exemplary embodiment of a system for determining compatibility between stand-alone application software and an operating system may be practiced in the context of a computer such as SUN® SPARCSTATION™, a UNIX®-based workstation, or a personal computer such as IBM PS/2®, APPLE® MACINTOSH® computer. A representative hardware environment is depicted in FIG. 1, which illustrates a typical hardware configuration of a workstation in accordance with a preferred embodiment having a central processing unit 10, such as a microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk storage units 20 to the bus 12, a user interface adapter 22 for connecting a keyboard 24, a mouse 26, a speaker 28, a microphone 32, and/or other user interface devices such as a touch screen (not shown) to the bus 12, communication adapter 34 for connecting the workstation to a communication network (e.g, a data processing network) and a display adapter 36 for connecting the bus 12 to a display device 38. The workstation typically has resident thereon an operating system such as Sun Microsystems' SOLARIS™ or another UNIX®-based operating system, or another operating system such as the MICROSOFT® WINDOWS® operating system, the IBM OS/2® operating system, or the APPLE COMPUTER® operating system. Those skilled in the art will appreciate that a system in accordance with the present invention may also be implemented on platfomis and operating systems other than those mentioned.

Figure 2:
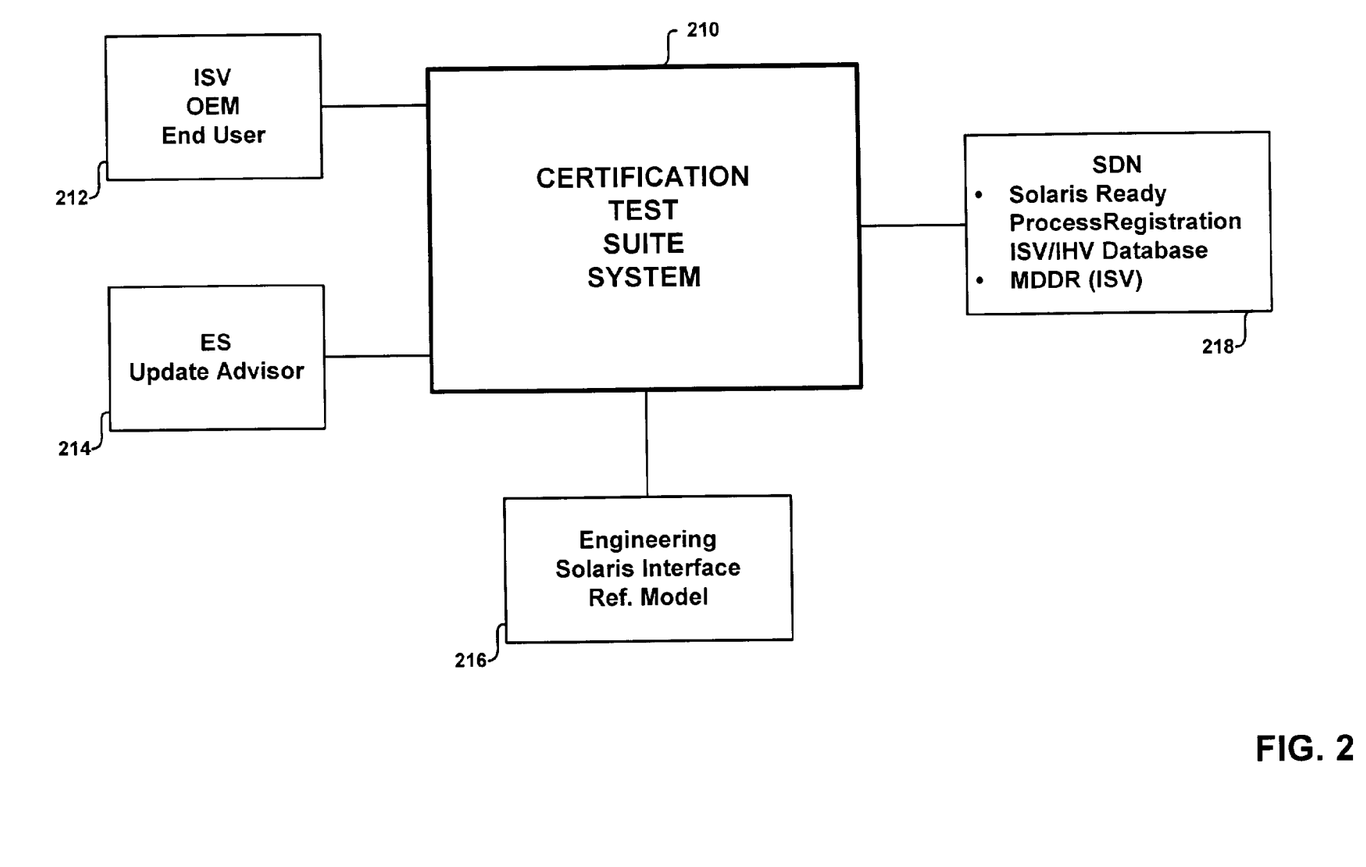
FIG. 2 is a context diagram illustrating a representative system and inputs to the system.

An exemplary system for determining compatibility between stand-alone application software and an operating system may be implemented as a software process (or set of processes) executable on a processor. FIG. 2 is a context diagram illustrating a representative system and inputs to the system. Referring to FIG. 2, a certification test suite system 210 may include software modules capable of testing for binary compatibility between a first software module, e.g., application software and a second software module, e.g., the Solaris operating system.

In practice, an Independent Software Vendor (ISV), Original Equipment Manufacturer (OEM) or even an end user 212 may run the utilities provided in the cerification test suite to determine whether the software application(s) they are developing comply with the SOLARIS™ public interfaces and the SOLARIS™ ABI. The utilities may include the appcert and pathchk utilities discussed above. Among other things, these utilities check to ensure that: (1) no private or demoted symbols are invoked by the application; (2) no SOLARIS™ libraries are statically linked; (3) no demoted libraries are invoked by the application; (4) all symbols invoked by the application are identified to belong to a known shareable image, and (5) no compatibility issues are raised (e.g., no symbols currently available but not supported in the future are invoked). In an exemplary embodiment, users must register with the certification test suite 210 prior to obtaining access to the utilities in the certification test suite 210.

The certification test suite system 210 may also receive inputs from an update advisor module 214. Update advisor module 214 may include a software module that permits the certification test suite to identify software installed by an ISV, OEM, or end user 212 by, e.g., collecting the MD5 signature of the binary fifes residing on a SOLARIS™ system used by the ISV, OEM, or end user 212. The MD5 algorithm takes as input a message of arbitrary length and produces as output a 128-bit "fingerprint" or "message digest" of the input. It is considered to be computationally infeasible to produce two messages having the same message digest, or to produce any message having a given prespecified target message digest. Therefore, the MD5 algorithm is suitable for generating a message that uniquely identifies a binary file. One of skill in the art will appreciate that other encoding routines could be used to uniquely identify a binary file, e.g., the combination of the file's name, date created, size, and directory/folder may be used to identify a file.

Ceritification test suite 210 may also receive inputs from an engineering module 216. In an exemplary embodiment, the engineering module provides a SOLARIS™ Interface Reference Model that contains the list of public and private symbols bound to the shareable libraries provided with SOLARIS™ and possibly in the future with Sun Microsystems, Inc. layer products. The SOLARIS™ Interface reference model may cover a standard set of runtime interfaces that constitute the ABI and may also include optional Sun Microsystems, Inc. packages that may be selected by users during installation. The engineering module may maintain a cross-reference table to identify the symbols, the libraries, the packages and the cluster package. This cross-reference table may be used by the utilities in the certification test suite 200.

Certification test suite 200 may also receive inputs from a Sun Microsystems, Inc. Developer Network (SDN) module. The SDN module maintains an Application Registration Database that may be used by the certification test suite 200 to track the MD5 signatures of applications that are certified. In addition, the SDN module maintains an ISV Application Database that stores information related to the application, including its compatibility status. The ISV Application Database may be made accessible to the public.

Figure 3:
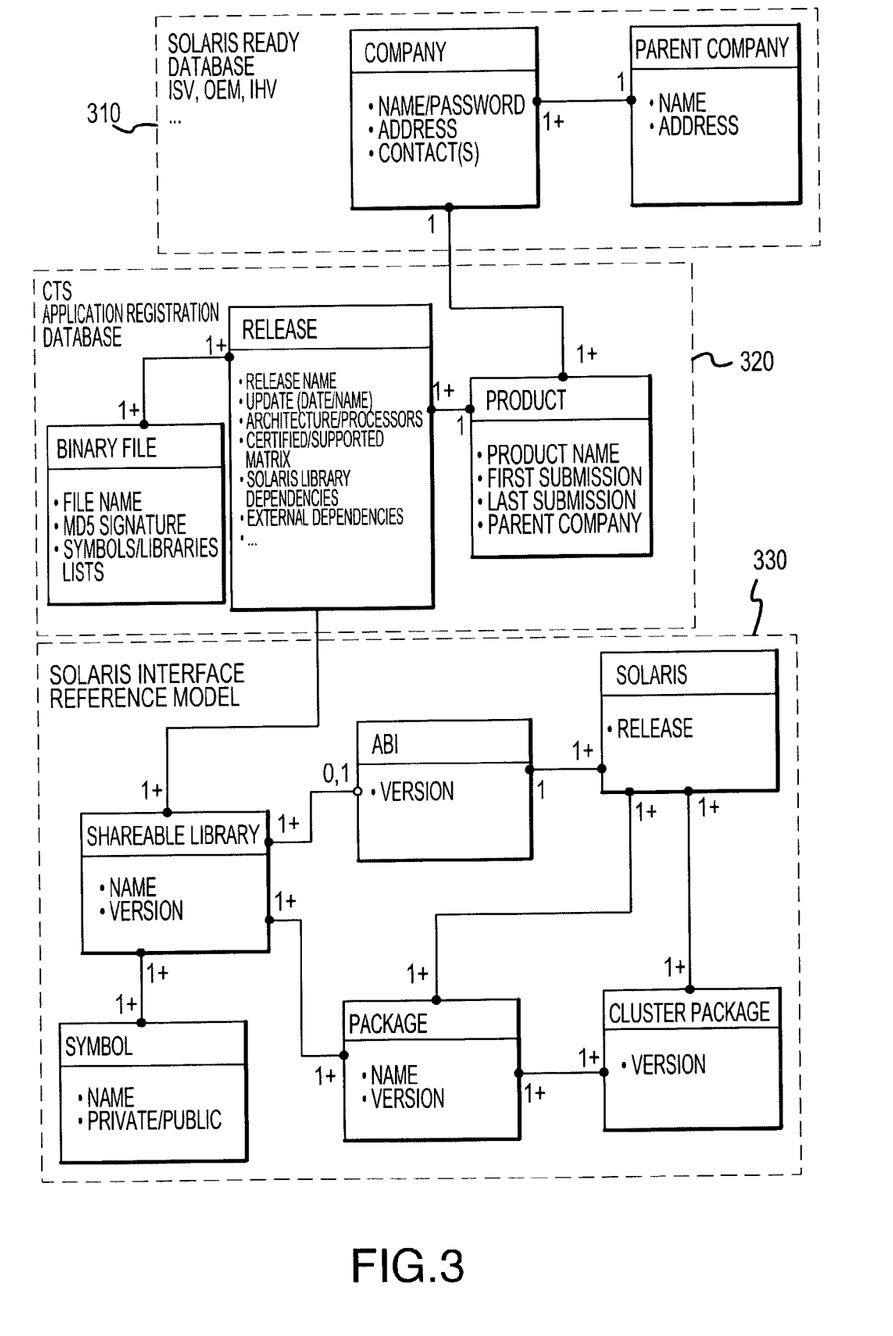
FIG. 3 is a schematic illustration of objects involved in the certification test suite during the analysis of an application.

FIG. 3 is a schematic illustration of objects involved in the certification test suite during the analysis of an application. Referring to FIG. 3, a SOLARIS™ Ready Database 310 includes information received from subscribers to the system This information may include, without limitation, the name of the company, address information, contact information, and similar information for a parent company, if applicable. A certification test suite application registration database 320 includes information related to the application(s) being certified for compliance with the ABI. For example, with respect to the binary file, the application registration database may include the file name, the MD5 signature, and the symbols and library lists referenced in the binary file. The application registration database may also include information related to the specific release including the release name, the date/name of an update, particular architectures or processors supported, releases that are certified or supported, SOLARIS™ library dependencies, and external dependencies. The application registration database may also include product-specific information including the product name, the first submission for certification, the last submission for certification, and the parent company, if any.

The SOLARIS™ Interface Reference Model 330 includes information required to determine ABI compatibility. The Interface Reference Model may be implemented as a database in which a specific SOLARIS™ release field is linked to ABI version information, Package information, and Cluster Package information. The ABI version information is linked to library and symbol information.

Figure 4:
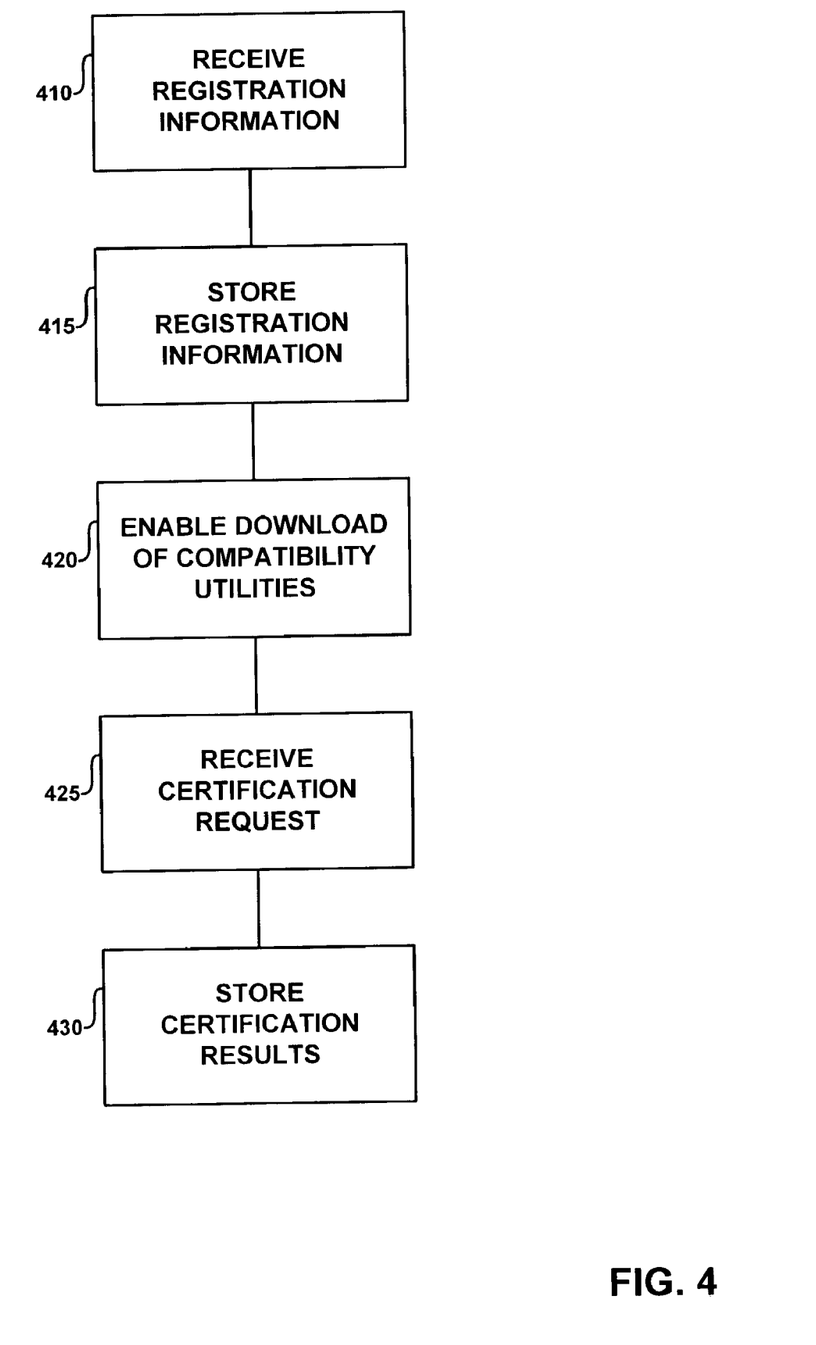
FIG. 4 is a flowchart illustrating a method of determining compatibility between stand-alone application software and an operating system.
Figure 5:
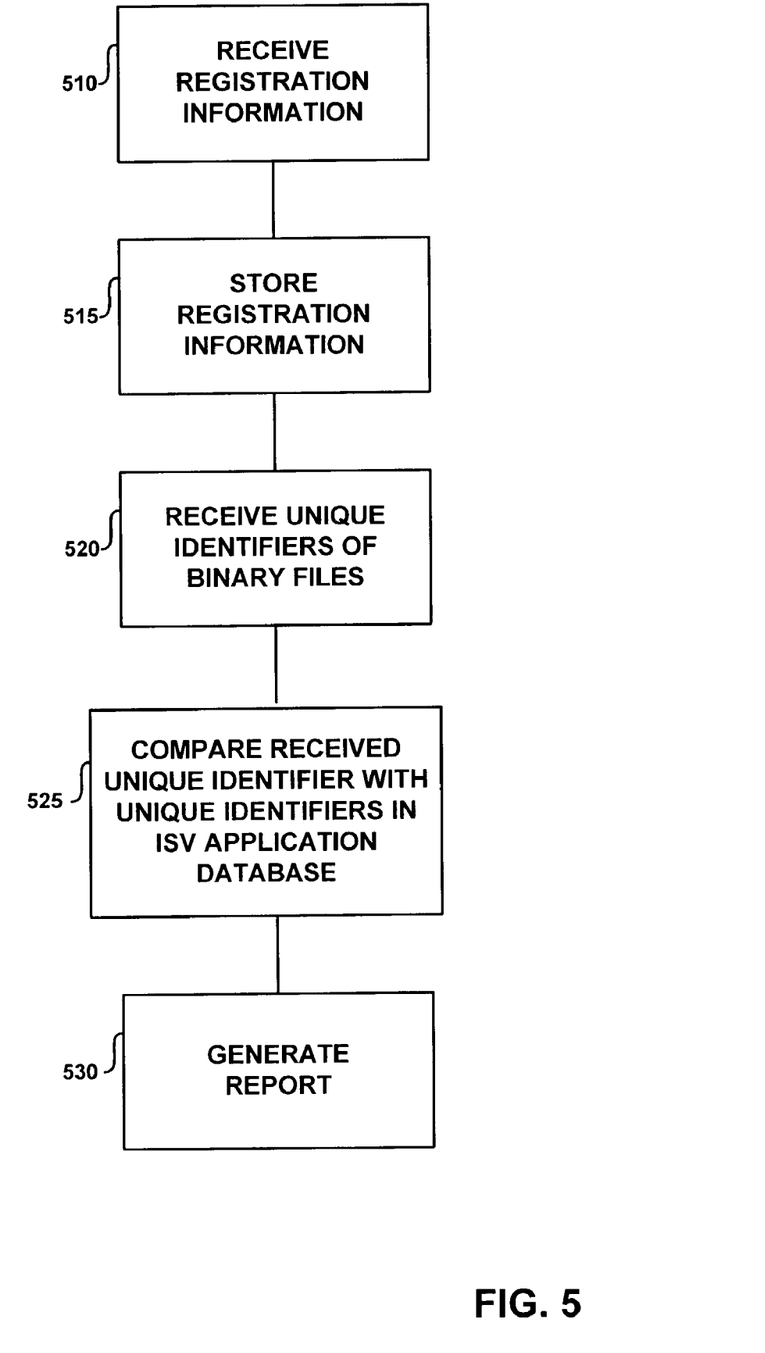
FIG. 5 is a flowchart illustrating an alternate method of determining compatibility between stand-alone application software and an operating system.

FIGS. 4–5 are flowcharts illustrating a method of determining compatibility between stand-alone application software and an operating system. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

An ISV or OEM who wants to certify an application must first register with the certification test suite. The registration process may be implemented over the internet (or other suitable communication medium). In an exemplary embodiment, registration may be accomplished by accessing the web site located at www.sun.com. At step 410, the certification test suite receives registration information from the ISV or OEM. The registration Information may include, e.g., the company name, including the name of a parent company, if applicable, the address, contact information for the company, and a password associated with the company. This information may be stored (step 415) in a User Registration Database on a computer readable medium, e.g., on a disc storage unit 20 as described above.

After the ISV or OEM has registered, one or more of the utilities that constitute the certification test suite may be made available for downloading (step 420) to the subscriber over the internet (or another suitable communication medium). The subscriber can then use the utilities in the certification test suite to determine whether the application software they are developing complies with the SOLARIS™ ABI. Advantageously, subscribers can use the utilities to test application software periodically during the development process so that compliance errors may be corrected prior to finalizing the software release.

The subscriber may elect at any time to request certification that the application software being developed complies with the SOLARIS™ ABI. In an exemplary embodiment, the subscriber may place a request by signing back into the web page at which subscriber registered and requests certification for a software module. In one embodiment, when the certification test system receives a certification request (step 420), the certification test system 210 may upload the binary file(s) from the subscriber and independently execute the utilities in the certification test suite against the binary file(s) received from the subscriber. In addition, the certification test suite may collect the MD5 signature of the binary code, which uniquely identifies the binary code. The results of the certification testing and the MD5 signature are stored in a computer readable medium, e.g., the ISV database. In a second embodiment, the certification request (step 420) received from the subscriber may include the results of a certification test executed by the subscriber and an identifier (e.g., the MD5 signature) that uniquely identifies the binary code associated with the test results. In this embodiment the certification test suite need not execute a separate certification test (although it may). Rather, the certification test suite may review the test results supplied by the subscriber and store the results in a computer readable medium, e.g., a database.

In an exemplary embodiment, the certification test suite system includes ABI interface information from multiple releases of the SOLARIS™ operating system. When an ISV requests certification, the ISV may supply the lowest (i.e., oldest) SOLARIS™ release currently supported by the application. The certification test suite system may automatically verify compliance of the application to the ABI for the SOLARIS™ release specified by the ISV and any more recent releases. In addition, if optional Solaris packages are required to execute the application, the certification test suite system can certify compliance with the ABI of any such optional modules.

In another aspect, the certification test suite system may automatically notify subscribers to the system when a new release of SOLARIS™ is becoming available. By way of example, the certification test suite system may inform subscribers by email at a predetermined time in advance of a new release or when changes are implemented that may affect the compliance of their application with the SOLARIS™ ABI.

In another aspect, at least some of the information in the ISV database may be made publicly available to enable end users of the application software to ensure that the application software is compatible with the SOLARIS™ ABI. This process is illustrated in FIG. 5. By way of example, an end user may register as a subscriber to the system, and the system may receive the registration information (step 510) and store the registration information in a computer readable medium, e.g., a database (step 515). The end user may then access the update advisor module 214 to collect the MD5 signatures of user software binary files installed on one or more computer systems. In an exemplary embodiment, the end user may download software onto their system that collects an identifier that uniquely identifies the binary files residing on their computer system, e.g., the MD5 signature of the binary file. The identifiers may then be uploaded to the certification test suite system (step 520). The identifiers may then be compared to the unique identifiers in the ISV Application Database to determine with which (if any) versions of the SOLARIS™ ABI the applications have been certified as being compatible (step 525). A suitable report may be generated (step 530) and the results may be reported back to the end user over a suitable communication link, e.g., via the internet. This enables end users to better gauge whether upgrading their SOLARIS™ operating environment may create compatibility issues with existing application software.

While the invention has been particularly shown and described with reference to a preferred embodiment thereof, it will be understood by those skilled in the art that various other changes in the form and details may be made without departing from the spirit and scope of the invention.

What is claimed is:

1. A computer-based method for determining compatibility between a first software module and a second software module, comprising:

receiving registration information from a subscriber, the subscriber being associated with a subscriber computer system;

storing the registration information in a computer readable storage medium;

providing a compatibility testing tool kit to the subscriber;

receiving a certification request from the subscriber;

assigning an identifier that uniquely identifies the first software module as being associated with the subscriber's computer system, wherein the identifier is a MD5 signature;

in response to the certification request, performing an analysis of the first software module for compatibility with the second software module, wherein performing includes comparing the identifier of the first software module to a list of unique identifiers associated with the second software module to determine if the first software module is compatible with the second software module, and wherein performing further includes statically examining executable and shared objects and ensuring that one or more path names are valid and portable; and storing the results of the analysis and the identifier in a computer readable storage medium.

2. The method of claim 1, further comprising making the results of the analysis available for inspection.

3. The method of claim 1, wherein the step of receiving registration information from a user comprises establishing a communication link with a computer workstation used by the subscriber.

4. The method of claim 1, wherein the step of storing the registration information in a computer readable medium comprises storing the registration information in a database.

5. The method of claim 1, wherein the step of providing a compatibility testing tool kit to the subscriber comprises enabling a customer to download a compatibility testing tool kit over a suitable communication link.

6. The method of claim 1, wherein the step of receiving a certification request comprises establishing a communication link with a computer workstation used by the subscriber.

7. The method of claim 1, wherein the step of analyzing the first software module for compatibility with the second software module comprises determining whether the first software module complies with the application binary interface of the second software module.

8. The method of claim 1, wherein the step of analyzing the first software module for compatibility with the second software module is performed by a network-based server.

9. The method of claim 1, wherein the certification request includes the results of compatibility tests of the MD5 signature of the first software module.

10. The method of claim 9, wherein the step of analyzing the first software module for compatibility with the second software module comprises reviewing the results of the compatibility tests received with the certification request.

11. The method of claim 1, wherein the step of storing the results of the analysis and the identifier in a computer readable medium includes storing the information in a database.

12. A computer-based system for determining binary compatibility between application software and an application binary interface(ABI) of at least one operating system, comprising:
   a registration module for receiving registration requests from subscribers to the system and storing the registration information in a computer readable storage medium;
   a certification test suite system module comprising software tools for testing binary compatibility between application software and the ABI, wherein the software tools are made available to registered subscribers of the system and wherein the software tools compare a unique identifier associated with application software to a list of unique identifiers associated with application software compatible with the ABI, statically examine executable and shared objects, and ensure that one or more path names are valid and portable;
   an update advisor module that collects a unique identifier to the application software; and
   computer readable storage media for storing the identifier collected by the update advisor module and the results of the binary compatibility tests.

13. A computer-based method for evaluating the compatibility between one or more binary files on a computer and one or more application binary interfaces associated with at least one operating system, comprising:
   storing, in a network-based computer, compatibility information between binary files and the one or more application binary interfaces associated with the at least one operation system, wherein the compatibility information is associated with an identifier that uniquely identifies the binary file;
   receiving registration information from a subscriber;
   storing the registration information in a computer readable storage medium;
   receiving the unique identifiers of binary files on the subscriber's computer system;
   comparing the received unique identifiers to unique identifiers in a database associated with the network-based computer;
   statically examining executable and shared objects;
   ensuring that one or more path names are valid and portable; and
   generating a report indicating which of the received unique identifiers have a match in the database associated with the network computer.

14. The method of claim 13, wherein the step of receiving registration information from a user comprises establishing a communication link with a computer workstation used by the subscriber.

15. The method of claim 13, wherein the step of storing the registration information in a computer readable medium comprises storing the registration information in a database.

16. The method of claim 13, further comprising enabling the subscriber to download a tool for collecting the unique identifier associated with binary files on the subscriber's computer system.

17. The method of claim 13, wherein the unique identifier is an MD5 signature.

18. The method of claim 13, further comprising the step of storing the report on a computer readable medium.

* * * * *